PHASE MODULATION

Filed May 13, 1948

INVENTOR
JARRETT L. HATHAWAY
BY [signature]
ATTORNEY

Patented Mar. 23, 1954 2,673,332

UNITED STATES PATENT OFFICE 2,673,332

PHASE MODULATION

Jarrett L. Hathaway, Manhassett, N. Y., assignor to Radio Corporation of America, a corporation of Delaware Application May 13, 1948, Serial No. 26,775

3 Claims. (Cl. 332—18)

The purpose of my invention is to improve the signal to noise ratio for a phase modulation system of transmission and reception within a restricted band of frequencies, the improvement being brought about by means of a frequency sensitive gain control operating automatically on the audio modulating voltage.

A phase modulation transmitter produces frequency deviation which is directly proportional to the amplitude and frequency of the modulating potential. Such a transmitter may be satisfactorily received on a frequency modulation receiver, providing a network having response inversely proportional to frequency is employed in the receiver subsequent to demodulation. With audio programs, such a system suffers in the received signal to noise ratio as compared to one having less difference in the transmitted low and high frequency deviation. That is, in the ordinary phase modulation transmitter, deviation is extremely small for the low frequency audio components, assuming that the deviation produced by the high frequencies is restricted within a given band of frequencies. This, in turn, calls for extremely high relative gain in the low frequency audio portion of the receiver which brings out low frequency noise and causes an inferior signal to noise ratio.

One method of increasing low frequency transmitter deviation is to accentuate the low frequency modulating potentials. Then the audio frequency amplifier may include audio frequency coupling networks with shunt capacitors that attenuate the high frequencies more than the low frequencies so the overall gain decreases as the frequency increases. This is done when the qualities of a frequency modulated transmitter are desired by making the amplitude of the modulating potential inversely proportional to frequency. A frequency modulated wave receiver is used for this transmission or a phase modulated receiver with countercorrection. It may also be accomplished through the use of a filter in the audio portion of the transmitter, having a slope appreciably less than inversely proportional to frequency.

It is the purpose of this invention to obtain improved signal to noise ratio in the receiver of a phase modulation type of timing modulation system by increasing transmitter low frequency deviation, while at the same time restricting deviation to a given band. This low frequency deviation increase is obtained by automatically controlling the gain of an audio amplifier located in the circuit ahead of the phase modulator in a novel manner.

The improved phase modulator system of my invention increases low frequency deviation of the phase modulation transmitter without altering the characteristic frequency response of the audio voltage applied to the modulator. This is accomplished in accordance with my invention by increasing the audio amplifier gain when the program does not contain appreciable high frequency energy. Thus, it may be said that I compress the stronger modulation components falling in a band below a selected frequency and compress to a greater extent modulation components falling in a frequency band above said selected frequency.

Figures 1, 2:
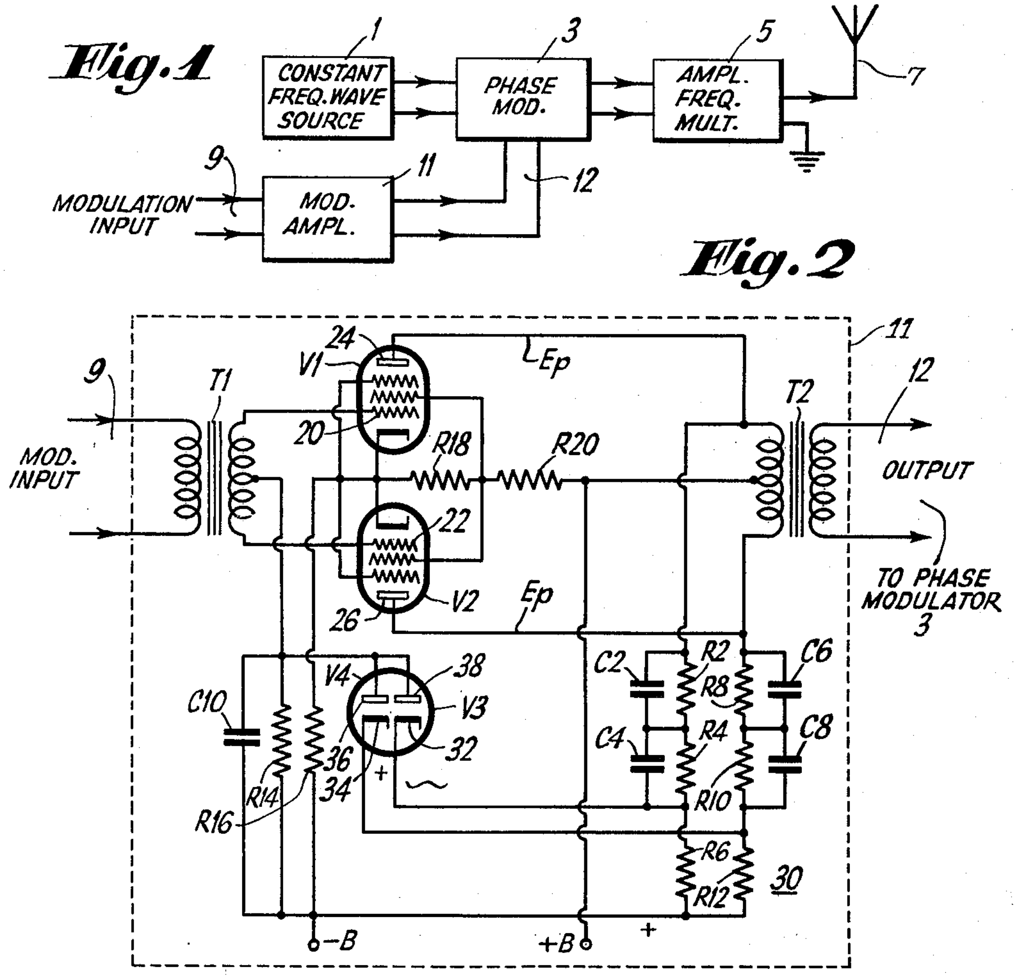
Fig. 1 is a block diagram of the complete phase modulation transmitter incorporating the features of this invention.
Fig. 2 is a schematic diagram of the audio amplifier which serves to automatically limit deviation as a function of program content.

Referring to Fig. 1, the radio frequency portion of the transmitter is shown to include a constant frequency source of energy 1; a phase modulator 3, such as that described by Roberts in U. S. Patent #2,143,386; a frequency multiplier-amplifier 5, of one of the types known to the art; an antenna 7 of a type known to the art; a source of program potential 9 to be transmitted; and a frequency sensitive automatically controlled amplifier 11, described more fully hereinafter.

Fig. 2 is a schematic diagram of the automatically controlled audio amplifier 11. This amplifier comprises two tubes V1 and V2 with their control grids 20 and 22 coupled in push-pull relation by the secondary winding of transformer T1. The primary winding of transformer T1 is coupled by leads 9 to a modulation source not shown. The anodes 24 and 26 of the tubes V1 and V2 are coupled in push-pull relation to the primary winding of a transformer T2, the secondary winding of which is coupled by leads 12 to the phase modulator 3 as shown in Fig. 1. Some of the modulation is diverted from the output of the tubes V1 and V2 and fed by network 30 to the cathodes 32 and 34 of rectifiers V3 and V4. The anodes 36 and 38 of the rectifiers are tied together and connected to a tap on the secondary winding of transformer T1 to supply bias to the grids 20 and 22. The anodes 36 and 38 of the rectifiers are also in a direct current rectifier circuit including load resistor R14 shunted by capacitor C10. The cathodes of tubes V1 and V2 are connected by resistor R16 to the rectifier cathode end of resistor R14 to complete the bias circuit for tubes V1 and V2. This direct current rectifier circuit is completed by branched circuits including resistors R6 and R12 to the cathodes 32 and 34. The nature of the network 30 and its function is given below in the statement of operation. The input to the network may be taken from other points in the audio frequency channel or be obtained by detecting the transmitter output.

In operation, program is fed in through transformer T1 to the grids of push-pull amplifier tubes, V1 and V2. These tubes act as automatically controlled amplifiers, feeding energy out by way of transformer T2 to the phase modulator. A portion of the output energy from V1 and V2 is diverted to the diode rectifiers, V3 and V4, through the networks comprising resistors R2, R4, R6, R8, R10, R12, and capacitors C2, C4, C6, and C8. It is the purpose of these networks to attenuate the low frequency potentials applied to the diode rectifiers and also to apply a positive "delay" bias to the rectifier cathodes. This "delay" bias prevents rectification of the low level signal potentials and thus tends to produce a sharper knee on the control characteristics, as described in Hathaway U. S. Patent #2,244,695. In the previously mentioned network, capacitors C2 and C6 act to bypass all audio frequencies, while capacitors C4 and C8 act to bypass only the higher audio frequencies. Thus, for low audio frequencies, that is those below about 400 C. P. S., the audio frequency potentials delivered to the cathode elements of V3 and V4, are attenuated by the resistance capacity combinations C4, R6 and C8, R12. At the same time, D. C. potentials are applied to the cathodes of V3 and V4 which are:

$$E=E_P\times\frac{R6}{R2+R4+R6}$$

$$E_P\times\frac{R12}{R8+R10+R12}$$

In order to maintain equal rectification by each of the diodes the network associated with feeding the cathode of V3 may be made equal to that which feeds V4.

In certain cases, where desired rectification is unsymmetrical, the two networks might be made dissimilar.

The rectified potential developed at the anodes of V3 and V4 is filtered to pure D. C. by means of condenser C10. Resistor R14 serves to slowly discharge C10 when program potentials drop. Thus, C10 is charged relatively rapidly, by way of relatively low impedance circuits, when the program level increases, and is slowly discharged when the program level falls. This asymmetrical rate is highly desirable, as described in my U. S. Patent #2,244,695.

Residual, or no signal bias, for tubes V1 and V2, is supplied by way of cathode resistor R16 which passes both cathode currents as well as current through resistors R18 and R20. These latter resistors serve a dual purpose in supplying and stabilizing both the cathode and the screen grid potentials on V1 and V2, the screens being fed from the junction of R18 and R20, and B potential being applied to R20.

In operation, the gain of the push-pull stage V1 and V2 is reduced during high level audio passages by way of the increasing bias developed by the rectifier across C10. This reduced level prevents excessive deviation by the following phase modulator. Since the deviation would otherwise be greatest at the higher frequencies, the gain of the push-pull stage is made least when the audio energy is excessive in the higher frequencies. On the other hand, when high frequency program content is minimum, the gain becomes less restricted and goes up. This action is brought about by means of the before mentioned network.

The gain of the push-pull stage is determined by the bias applied to tubes V1 and V2, and this depends upon the potential across C10. When the audio program energy is excessive in the higher frequencies, the gain is least, this gain depending on the amount of energy fed back through network 30 to rectifier V3, V4. However, once this gain level has been established by the relative amount of high frequency program energy, the frequency response of the amplifier is flat over the entire band of frequencies. In other words, each and every frequency of the entire frequency band is amplified with the same predetermined gain as established by the energy fed back through network 30 when program energy of frequency higher than a predetermined frequency is present. This flat frequency response over the band of frequencies considered is represented as line A of Fig. 3. Now, if the amount of high frequency program energy decreases substantially, or if the program content consists of frequencies all below a predetermined value, the amount of energy fed back through network 30 changes to force up the gain of the push-pull stage. However, for all the frequencies of the (decreased) band of frequencies now being fed through the amplifier, the gain is again constant. Each and every frequency of the lessened input frequency band is now amplified with the same gain. Line A of Fig. 3 will still be horizontal, but of course will not extend as far to the right or high frequency end as under the conditions previously discussed. If the vertical scale in Fig. 3 indicated absolute amplifier gain, then under these latter conditions the line A would rise or move upwardly, but would still be horizontal.

Figures 3, 4:
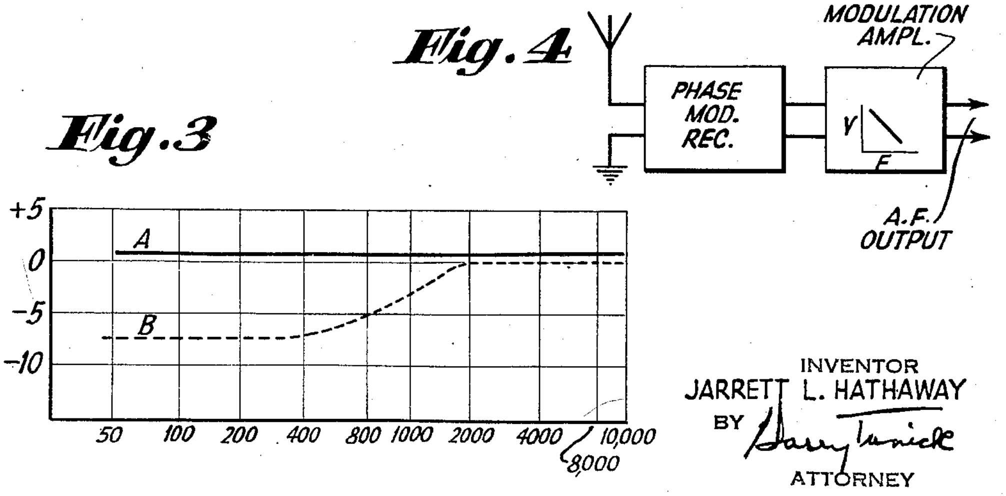
Fig. 3 shows in curve A the audio frequency response of the audio amplifier and in curve B the control sensitivity of this amplifier.
Fig. 4 illustrates by rectangles a phase modulation receiver adapted for reception of wave energy sent out by the transmitter of Fig. 1.

The control sensitivity of the amplifier biasing network is shown at line B in Fig. 3. This indicates that automatic gain reduction occurs at about 8 db lower level for high frequency tones than for low frequency tones. In other words, to produce the same reduction in amplifier gain, a low frequency tone of, say, 100 C. P. S. would have to be 8 db higher in amplitude level than a high frequency tone of, say, 4,000 C. P. S. It is this increased control activity at high frequencies which allows for greater low frequency deviation by causing the gain to be reduced more in response to the higher frequencies than in response to the lower frequencies.

The transmissions from this type of transmitter may be satisfactorily received on an ordinary FM receiver provided a frequency compensating network is utilized in the circuit following detection. This compensating network should have a response inversely proportional to frequency, as would be the case for reception on an ordinary phase modulation transmitter.

This receiver may be conventional and is then as illustrated by rectangle and line connection in Fig. 4.

What is claimed is:

1. A phase modulation transmitter including circuits and apparatus for modulating the phase of alternating current the mean frequency of which is substantially constant, said circuits and apparatus including a path wherein modulation energy flows, said path including a pair of electron discharge devices each having electrodes including a control grid and an anode, a circuit for applying modulation energy differentially to said control grids, a circuit coupling said anodes in push-pull relation for supplying energy to the phase modulator, a pair of rectifiers each having an anode and a cathode, a rectifier circuit including a resistor and a shunting condenser connected between the anodes and cathodes of said rectifiers, connections including said resistor between the control grids and cathodes of said devices, and a capacitive and resistive network which increasingly attenuates modulation energy as the frequency thereof decreases coupling the anodes of said devices to the cathodes of said rectifiers.

2. A phase modulation transmitter as recited in claim 1 wherein said rectifier circuit includes separate biasing resistors in the cathode circuits of said rectifiers to delay rectification until the magnitude of the modulation energy exceeds a selected value.

3. In a phase modulator system, a modulator stage wherein alternating current the phase of which is to be modulated flows, a modulation amplifier comprising a pair of electron discharge devices each having an anode, a cathode and a control grid, transformer means for feeding modulating potentials differentially to the control grids of said devices, transformer means coupled differentially to the anodes of said devices for feeding amplified modulation energy to said modulator stage, two resistors in series connected between the control grids and cathodes of said devices, a capacitor in shunt to one of said resistors, a pair of rectifiers each having an anode and a cathode, a connection tying the anodes of said rectifiers together and to the grid end of said one resistor, separate resistors connecting the cathodes of said rectifiers to the other end of said one resistor, and a frequency discriminating network coupling the anode of each of said devices to the cathode of a different one of said rectifiers.

JARRETT L. HATHAWAY.

References Cited in the file of this patent

UNITED STATES PATENTS

| Number | Name | Date |
|---|---|---|
| 2,096,759 | Purington | Oct. 26, 1937 |
| 2,179,182 | Hansell | Nov. 7, 1939 |
| 2,430,978 | Foster | Nov. 18, 1947 |
| 2,469,218 | Thomas | May 3, 1949 |